(12) United States Patent
Franz et al.

(10) Patent No.: US 8,616,525 B2
(45) Date of Patent: Dec. 31, 2013

(54) VALVE FOR SEPARATING PRODUCT MEDIA IN THE PIPES OF A PRODUCT-CARRYING SYSTEM

(75) Inventors: Stephan Franz, Noerdlingen (DE); Frank Neuhauser, Neresheim (DE)

(73) Assignee: Südmo Holding GmbH (DE)

( * ) Notice: Subject to any disclaimer, the term of this patent is extended or adjusted under 35 U.S.C. 154(b) by 1110 days.

(21) Appl. No.: 12/561,597

(22) Filed: Sep. 17, 2009

(65) Prior Publication Data

US 2010/0096578 A1      Apr. 22, 2010

Related U.S. Application Data

(63) Continuation of application No. PCT/EP2008/002034, filed on Mar. 13, 2008.

(30) Foreign Application Priority Data

Mar. 19, 2007    (DE) .................. 10 2007 014 282

(51) Int. Cl.
*F16K 41/12*    (2006.01)

(52) U.S. Cl.
USPC .................. 251/331; 251/335.2; 251/368

(58) Field of Classification Search
USPC ...................... 251/331, 335.2, 368
See application file for complete search history.

(56) References Cited

U.S. PATENT DOCUMENTS

| | | | |
|---|---|---|---|
| 784,200 A | | 3/1905 | Zumwalt |
| 2,654,559 A | * | 10/1953 | Franck .......................... 251/331 |
| 2,702,686 A | * | 2/1955 | Fortune ....................... 251/335.2 |
| 3,204,919 A | * | 9/1965 | Tripoli et al. .................. 251/331 |
| 3,246,872 A | * | 4/1966 | Seltsam ......................... 251/331 |
| 3,812,398 A | * | 5/1974 | Kozel et al. ................... 251/331 |

(Continued)

FOREIGN PATENT DOCUMENTS

| | | |
|---|---|---|
| DE | 2241550 A1 | 3/1974 |
| DE | 2429448 A1 | 1/1976 |

(Continued)

OTHER PUBLICATIONS

European Office Action; Application No. 10 2007 014 282.1; Sep. 7, 2010; 5 pages.

(Continued)

*Primary Examiner* — John Bastianelli
(74) *Attorney, Agent, or Firm* — St. Onge Steward Johnston & Reens LLC

(57) ABSTRACT

The invention relates to a valve for separating product media in pipes of a product-carrying system. The valve comprises a valve housing and a valve body arranged in a valve housing interior. The valve has a drive element which is movable in the axial direction, is connected to the valve body and is intended for moving the valve body. The valve further comprises a sealing diaphragm for sealing a valve housing interior on the drive side. The sealing diaphragm has a radially extending diaphragm body with a radially inner opening through which the drive element reaches. The diaphragm body has a radially outer edge region and a radially inner edge region which surrounds the radially inner opening. The radially outer edge region is clamped radially and the radially inner edge region is clamped axially. The sealing diaphragm is manufactured from a dimensionally stable material which is thermally resistant up to at least approximately 130° C.

18 Claims, 9 Drawing Sheets

(56) References Cited

U.S. PATENT DOCUMENTS

| | | | |
|---|---|---|---|
| 5,029,813 A * | 7/1991 | Walton et al. | 251/335.2 |
| 5,941,505 A * | 8/1999 | Nagel | 251/335.2 |
| 6,467,655 B1 * | 10/2002 | Ogawa | 222/309 |
| 6,685,164 B1 | 2/2004 | Koizumi et al. | |
| 2005/0006617 A1 | 1/2005 | Leys | |
| 2005/0042489 A1 * | 2/2005 | Fukuta et al. | 429/30 |
| 2005/0269533 A1 * | 12/2005 | Fedegari | 251/63.5 |
| 2006/0174945 A1 * | 8/2006 | Maula et al. | 137/341 |
| 2006/0273206 A1 * | 12/2006 | Schulz et al. | 239/533.1 |
| 2006/0289825 A1 * | 12/2006 | Wincek | 251/331 |

FOREIGN PATENT DOCUMENTS

| | | | |
|---|---|---|---|
| DE | 2759257 A1 | | 10/1978 |
| DE | 29507639 U1 | | 7/1995 |
| DE | 20211511 U1 | | 12/2002 |
| DE | 112004001268 T5 | | 7/2006 |
| DE | 60225928 T2 | | 4/2009 |
| EP | 1413812 | * | 4/2004 |
| GB | 1478239 | * | 6/1977 |
| GB | 1478239 A | | 6/1977 |
| GB | 2224335 A | | 5/1990 |
| WO | 9627096 A1 | | 9/1996 |
| WO | 03024713 A1 | | 3/2003 |

OTHER PUBLICATIONS

International Search Report; PCT/EP2008/002034; Jul. 2, 2008; 3 pages.

Südmo Holding GmbH, Riesbürg, company brochure "Südmo SVP Ventile Modell 2000, Ventiltechnik für jeden Einsatzbereich [Südmo SVP model 2000 valves, valve technology for any application]", 2006, p. 2 (16 pages).

International Preliminary Report on Patentability and Written Opinion of the International Searching Authority; PCT/EP2008/002034; Oct. 6, 2009; 7 pages.

* cited by examiner

VALVE FOR SEPARATING PRODUCT MEDIA IN THE PIPES OF A PRODUCT-CARRYING SYSTEM

CROSS REFERENCE TO RELATED APPLICATIONS

The present application is a continuation of pending International patent application PCT/EP 2008/002034 filed on Mar. 13, 2008 which designates the United States, and which claims priority of German Patent Application No. 10 2007 014 282.1 filed on Mar. 19, 2007.

BACKGROUND OF THE INVENTION

The invention generally relates to valves for separating product media in pipes of a product-carrying system. More specifically, the invention relates to a valve for separating product media in pipes of a product-carrying system which has a sealing diaphragm in order to seal a valve housing interior of the valve on the drive side.

A valve of this type is known, for example, from the Südmo Holding GmbH, Riesbürg, company brochure "Südmo SVP Ventile Modell 2000, Ventiltechnik für jeden Einsatzbereich [Südmo SVP model 2000 valves, valve technology for any application]", 2006, page 2.

The known valve is used in a product-carrying system in order to separate product media flowing through pipes of the product-carrying system from one another. Such a product-carrying system can be, for example, a food technology system which conveys flowable product media, such as, for example, yogurt or juice, along the pipes.

The known valve has a valve body which is inserted into a valve housing and is in the form of a shut-off member in order to seal off the pipe connecting branches of the valve housing, which branches are connected to the pipes of the food technology system, from one another. The shut-off member of the valve body is movable between an open valve position and a closed valve position by a drive element. In the open valve position, the product media from one pipe connecting branch can flow via the valve housing interior into the other pipe connecting branch of the valve housing. In the closed valve position, the shut-off member seals off the pipe connecting branches from one another, as a result of which the flow of product medium through the valve housing interior is interrupted.

The known valve operates under aseptic conditions in particular in food technology systems, and therefore hermetic sealing off of the valve housing interior from the surroundings is required. For this purpose, the known valve has a sealing diaphragm which seals the valve housing interior on the drive side. The sealing diaphragm has a radially extending diaphragm body with a central opening and is fitted into the valve in such a manner that the drive element which is connected to the shut-off member runs through the opening in the diaphragm body. In order to retain the sealing diaphragm in the valve in a stable position, a radially outer edge region of the diaphragm body is clamped radially between an axially immovable receiving element and the valve housing, and a radially inner edge region of the diaphragm body is clamped axially between a first and a second element of the drive element. The known sealing diaphragm is manufactured as a single piece from elastomer, for example from ethylene-propylene-diene elastomer, and a strength-increasing braided textile material is embedded into the diaphragm body on the drive side. The material of the sealing diaphragm is widened in a bead-like manner in the region of the radially inner and outer edge regions in order to retain the sealing diaphragm such that, during the operation of the valve, the sealing diaphragm is prevented from slipping under exposure to tensile and pressure loads. Furthermore, the widened, radially inner and radially outer edge regions prevent product media from moving behind the sealing diaphragm in the regions in which the latter is clamped.

One disadvantage of the sealing diaphragm is that the material thereof is not of stable design mechanically, and the service life of the elastomer is limited under high temperature influences and pressure peaks. As a result, upon load changes which occur repeatedly during the operation of the valve, the sealing diaphragm may have fine hairline cracks in the clamping regions thereof and in the exposed diaphragm body and may also tear without previous formation of hairline cracks. This causes frequent servicing of the valve necessitating shutdown times and consequently increased operating costs for the food technology system.

A further disadvantage is that the diaphragm body of the sealing diaphragm is not of dimensionally stable design, and therefore an additional element, the textile fabric, has to be provided to increase the strength of the diaphragm body. The central embedding of the textile fabric into the diaphragm body is difficult to bring about during production and leads to production of the sealing diaphragm being costly.

Another disadvantage is that the elastomer is thermally resistant only in a limited temperature range. It must be taken into account in this case that the valve housing interior and the valve body are subjected to very hot cleaning media, and also to hot steam. The temperature may cause fine hairline cracks to appear here in the diaphragm body. The damage to the elastomer caused by temperature considerably restricts the use of the valve under aseptic conditions.

In particular, evermore exacting requirements are imposed on the thermal stability of the sealing diaphragm in order to reduce servicing-induced interruptions due to the sealing diaphragm being exchanged.

SUMMARY OF THE INVENTION

It is therefore an object of the present invention to provide a remedy for this and to improve a valve of the type mentioned at the beginning in such a manner that servicing-induced interruptions in the product-carrying system are reduced.

According to the invention, a valve for separating product media in pipes of a product carrying system is provided, comprising: a valve housing having a valve housing interior and defining an axial direction; a valve body arranged in the valve housing interior; a drive element connected to the valve body for moving the valve body in the axial direction; a sealing diaphragm for sealing the valve housing interior against a drive side, the sealing diaphragm having a radially extending diaphragm body, the diaphragm body having a radially inner opening through which the drive element reaches, the diaphragm body further having a radially outer edge region and a radially inner edge region, the radially inner edge region surrounding the radially inner opening, the radially outer edge region being clamped radially and the radially inner edge region being clamped axially; the sealing diaphragm being manufactured from a dimensionally stable plastic which is thermally resistant up to at least approximately 130° C.

Configuration of the diaphragm from a dimensionally stable plastic advantageously enables the sealing diaphragm to be used in the valve without additional reinforcing elements, such as the braided textile material known from the prior art, for increasing the strength of the sealing diaphragm.

In this case, the dimensionally stable plastic has increased strength under exposure to tensile and pressure loads. According to the invention, a sealing diaphragm made from "dimensionally stable" plastic is to be understood as meaning that the sealing diaphragm maintains its geometrical shape when no forces are acting on the sealing diaphragm, and that said sealing diaphragm can be deformed elastically when bending forces act thereon.

The configuration of the sealing diaphragm from a plastic which is thermally resistant up to at least approximately 130° C. advantageously expands the thermal resistance of the sealing diaphragm in comparison to the sealing diaphragm made from ethylene-propylene-diene elastomer and advantageously enables the valve according to the invention to be used in food technology systems in which frequently hot media up to, for example, 120° C. flow through the pipes and the valve according to the invention. Thermally induced damage to the sealing diaphragm in the form of hairline cracks or fractures is prevented, as a result of which servicing costs of the valve according to the invention due to possibly exchanging the sealing diaphragm and therefore shutdown times of the food technology system are advantageously avoided.

In a preferred refinement of the invention, the plastic of the sealing diaphragm is thermally resistant up to at least approximately 150° C., preferably up to at least approximately 165° C., and furthermore preferably up to at least approximately 180° C.

This measure further increases the thermal resistance of the sealing diaphragm because the customary operating temperatures occurring at maximum lie far below the limit of thermal resistance. This also reduces the interruptions to the food technology system caused by servicing.

In another preferred refinement of the invention, the plastic of the sealing diaphragm is chemically resistant.

Since the media flowing through the pipes, in particular cleaning media, may be chemically aggressive to the material of the sealing diaphragm, the effect advantageously achieved by the chemical resistance of the sealing diaphragm is the long durability thereof, and the period of time between the servicing of the valve is considerably extended and at the same time costly interruptions to the food technology system caused by servicing are avoided.

In another preferred refinement, the plastic of the sealing diaphragm is a crosslinked laminated plastic.

By this means, the diaphragm body is advantageously particularly dimensionally stable and is mechanically durable when exposed to tensile and pressure loads. Furthermore, the arrangement of the material in the manner of layers prevents the diaphragm body from expanding over the course of time and the sealing diaphragm from losing its shape.

The sealing diaphragm is preferably manufactured from a class of materials which are formed on the basis of polytetrafluoroethylene plastic and have a laminated structure, as a result of which the sealing diaphragm advantageously has a high compressive creep resistance and a high springing-back and compensating capability while at the same time having great chemical resistance.

In another preferred refinement of the invention, a first section of the radially outer edge region of the diaphragm body is received in an axially extending seat which extends about the full circumference of an axially immovable receiving element.

On the drive side, the valve according to the invention has a receiving element for receiving the sealing diaphragm, said receiving element being provided with a seat, for example a groove, in which the radially outer edge region of the diaphragm body is received. The arrangement of the first section of the radially outer edge region of the diaphragm body in the seat brings about a centered positioning of the sealing diaphragm in the valve, as a result of which the sealing diaphragm is advantageously retained in a stable position in relation to radial displacements.

In this case, the sealing diaphragm is designed structurally such that, for the fitting thereof into the valve according to the invention, said sealing diaphragm can be automatically introduced into the receptacle during the movement of the valve disk without further technical measures and positioned, and therefore the fitting of the sealing diaphragm into the valve can advantageously be carried out in a particularly simple manner and with little cost in terms of personnel.

In another preferred refinement of the invention, a width of the seat is slightly larger than a thickness of the diaphragm body.

This measure has the effect that the first section of the radially outer edge region of the diaphragm body, which in particular as laminated material has a homogeneous thickness, can be introduced particularly easily into the seat, as a result of which the sealing diaphragm can be fitted into the valve according to the invention in a particularly simple manner.

In another preferred refinement of the invention, the seat is open toward the valve housing interior.

This measure has the effect that the diaphragm body can be arranged entirely on that side of the seat which faces the valve housing interior. Said arrangement advantageously permits a particularly good sealing action of the sealing diaphragm because the pressure in the valve housing interior presses the sealing diaphragm against the seat thereof.

In another preferred refinement of the invention, the radially outer edge region of the sealing diaphragm has a second, radially inner section which is clamped between a valve housing wall of the valve housing and a first receiving element wall of the receiving element.

The clamping of the second section of the radially outer edge region between a valve housing wall and a receiving wall brings about a structurally simple retaining of the sealing diaphragm, which is inserted into the seat, in the valve without additional auxiliary measures, and therefore advantageously the first section of the radially outer edge region of the sealing diaphragm is prevented from slipping out of the seat.

Furthermore, the bracing of the second section of the radially outer edge region between the valve housing wall and the first receiving element wall prevents product media or cleaning media from moving behind the sealing diaphragm in said region.

In another preferred refinement of the invention, the second section of the radially outer edge region bears against the first receiving element wall.

This measure has the effect that the sealing diaphragm is protected in the clamping region thereof in relation to bending of the diaphragm body when exposed to tensile and pressure loads, and therefore the plastic diaphragm body cannot break.

In another preferred refinement of the invention, the valve housing wall and the first receiving element wall are inclined toward the valve housing interior, an angle of inclination $\alpha$ of the valve housing wall relative to a radial direction being greater than an angle of inclination $\beta$ of the first receiving element wall relative to the radial direction.

By this means, the second section of the radially outer edge region of the diaphragm body is advantageously pressed particularly strongly in the region of curvature thereof against the first receiving element wall, and the diaphragm body is retained in a stable position even when exposed to high load stresses, and product medium is prevented from moving behind the clamping region.

In another preferred refinement of the invention, the first receiving element wall has a projection which is arranged in the region of the second section of the radially outer edge region of the diaphragm body.

The projection of the first receiving element wall presses into the diaphragm body, as a result of which advantageously the clamping action of the sealing diaphragm is improved in the region of the projection and the positional stability of the sealing diaphragm is increased. This improves the sealing action of the sealing diaphragm.

In another preferred refinement of the invention, the projection is designed in a manner extending about the full circumference.

The configuration of the projection in a manner extending about the full circumference brings about a particularly good clamping of the diaphragm body along the entire circumference thereof, and therefore the sealing diaphragm advantageously has a particularly good sealing action.

In another preferred refinement of the invention, in the region of the second section of the radially outer edge region, the valve housing wall has a ribbing with at least one rib which engages in a form-fitting manner in the material of the sealing diaphragm.

The ribbing of the valve housing wall brings about a retention of the sealing diaphragm in a form-fitting manner, since the ribs of the ribbing press into the material of the sealing diaphragm. The sealing diaphragm is thereby advantageously even better secured against slipping out of the seat of the receiving element.

In another preferred refinement of the invention, in the region of the second section of the radially outer edge region of the sealing diaphragm, the receiving element wall has a ribbing with at least one rib which engages in a form-fitting manner in the material of the sealing diaphragm.

The ribbing of the receiving element wall likewise brings about a retention of the sealing diaphragm in a form-fitting manner, since the material of the sealing diaphragm is plastically deformed by the ribs of the ribbing engaging in the material of the sealing diaphragm.

In another preferred refinement of the invention, the ribbing of the first receiving element wall is arranged on a surface of the projection.

This measure has the advantage that the sealing diaphragm is retained even more securely in the valve, since the ribs of the ribbing in the clamping region of the radially outer edge region engage in the sealing diaphragm.

In another preferred refinement of the invention, the at least one rib of the ribbing of the valve housing wall and/or of the receiving element wall extend in circumferential direction.

The profile of the ribs of the ribbings in the circumferential direction, i.e. transversely with respect to the axial direction of the valve, bring about a particularly good retention of the sealing diaphragm as compared with a, for example, axial profile of the ribs, since the form-fitting connection between the ribs of the ribbings and the material of the sealing diaphragm is achieved transversely with respect to the tensile stress on the diaphragm body that occurs during the operation of the valve. This advantageously even more securely prevents the sealing diaphragm from slipping.

In another preferred refinement of the invention, the at least one rib of the ribbing of the valve housing wall and/or of the receiving element wall are designed in a manner extending about the full circumference.

The configuration of the ribs of the ribbings in a manner extending about the full circumference advantageously brings about a particularly optimum positional stability of the diaphragm body such that the sealing action of the sealing diaphragm is uniformly good along the circumference of the diaphragm body.

In another preferred refinement of the invention, the radially inner edge region of the sealing diaphragm is clamped between a first element and a second element of the drive element, an end side of the first element, which end side faces the diaphragm body, having a projection which faces the diaphragm body and engages in the radially inner edge region of the diaphragm body.

The axial clamping of the radially inner edge region of the diaphragm body is advantageously obtained in a structurally very simple manner, since the radially inner edge region is clamped between the respective, mutually facing end sides of the first and second elements, and the end sides of the two elements press against each other in the axial direction. Furthermore, this type of clamping has the effect that the valve can be of particularly simple design in the region of the radially inner edge region of the diaphragm body, since no additional clamping elements are necessary for the sealing diaphragm.

When the radially inner edge region of the diaphragm body is clamped between the first and second elements of the drive element, the projection engages in the material of the sealing diaphragm, advantageously resulting in an optimum axial clamping of the radially inner edge region and therefore in a high seal tightness of the sealing diaphragm. In this connection, it is preferred that the end side of the second element is of planar design radially, since a pressing action of the end side of the second element is homogeneous along the entire extent of the end side of the second element. Furthermore, the arrangement of the projection on the end side of the first element advantageously enables a radial clamping of a radially inner edge of the radially inner edge region to the drive element, since the material which is compressed by the projection can flow to the inner edge of the radially inner edge region of the diaphragm body where it can press onto the drive element.

In another preferred refinement of the invention, the projection is spaced apart from an inner edge of the radially inner edge region of the diaphragm body.

The effect of spacing apart the projection from an inner edge of the radially inner edge region of the diaphragm body is that the form-fitting connection of the radially inner edge region and of the material of the sealing diaphragm is achieved at a distance from the inner edge of the radially inner edge region, thus advantageously preventing product media from moving behind in the clamping region, which could cause damage to the material of the sealing diaphragm in the clamping region. This advantageously increases the durability of the sealing diaphragm.

In a further preferred refinement of the invention, the projection is designed in a manner extending about the full circumference.

This measure has the advantage of achieving a particularly high sealing action of the sealing diaphragm on all sides, since the form-fitting connection of the radially inner edge region of the diaphragm body and of the material of the sealing diaphragm is brought about in a manner extending about the full circumference.

In another preferred refinement of the invention, a region of the end side of the first element, which end side is adjacent to the radially inner edge of the radially inner edge region of the diaphragm body, is rounded as seen radially inward.

This measure advantageously enables the sealing diaphragm material which is compressed by the projection to flow radially inward such that said material can fill the space between the rounded region of the end side of the first element and the drive element, and the radially inner edge of the radially inner edge region is clamped radially against that surface of the sealing diaphragm which is on the drive side.

Further advantages and features emerge from the description below and from the attached drawing.

It goes without saying that the features mentioned above and those which have yet to be explained below can be used not only in the stated combinations but also in different combinations or on their own without departing from the scope of the present invention.

BRIEF DESCRIPTION OF THE DRAWINGS

The invention is described and explained in more detail below with reference to a number of selected exemplary embodiments in conjunction with the attached drawing, in which.

DETAILED DESCRIPTION OF PREFERRED EXEMPLARY EMBODIMENTS

Figure 1:
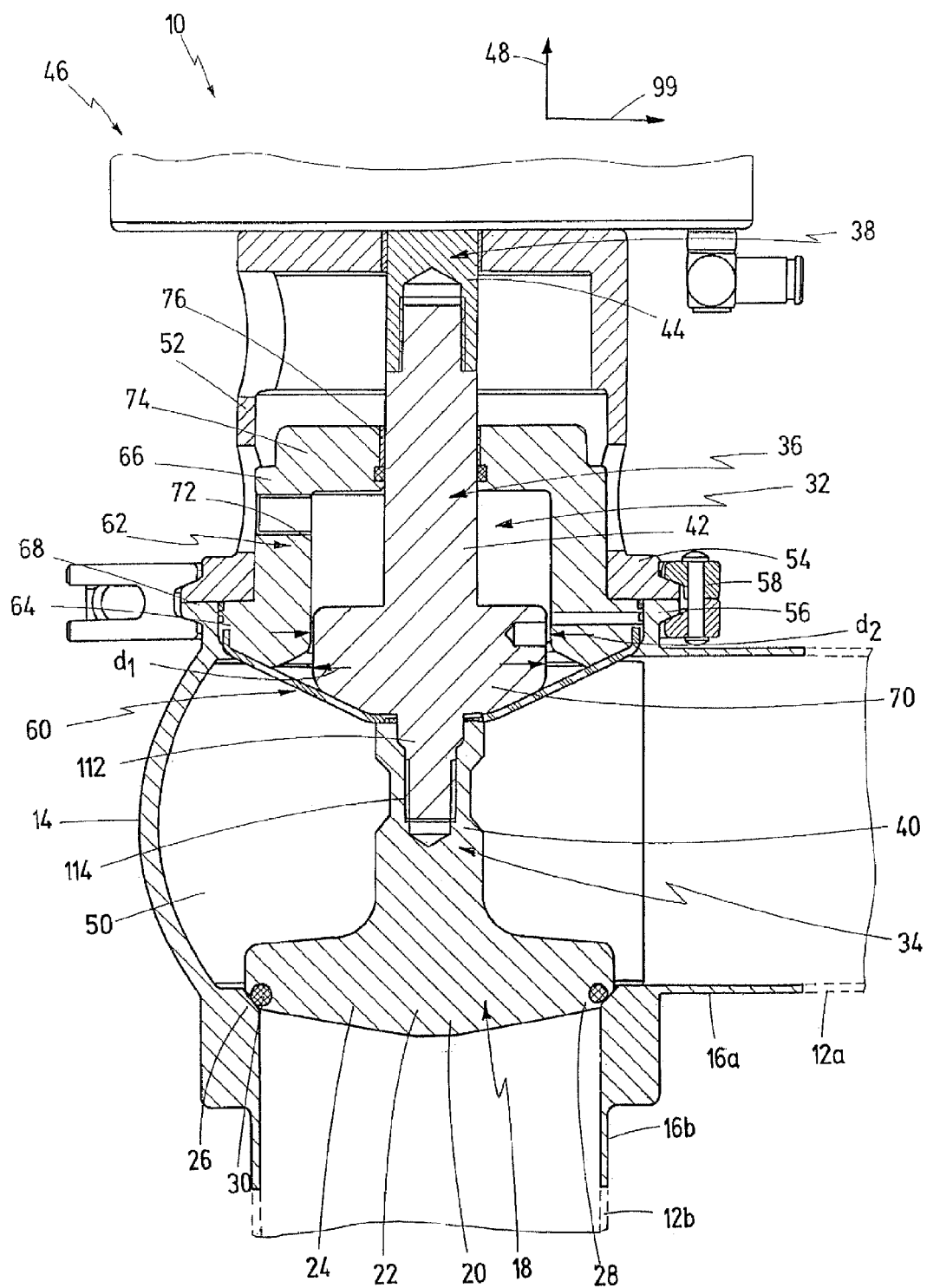
FIG. 1 shows a valve according to the invention.

FIG. 1 illustrates a valve which is labeled with the general reference number 10. The valve is used in a product-carrying system, for example in a food technology system, in order to separate product media, such as, for example, yogurt or juice, which flow through pipes 12*a*, *b* of the food technology system, from one another. The valve is designed, for example, as an aseptic, right-angled valve of the SVP-S371 type.

The valve 10 has a substantially spherical valve housing 14 with two pipe connecting branches 16*a*, *b* which run perpendicularly to each other and are connected to the pipes 12*a*, *b* of the food technology system. A valve body 18 which has a shut-off member 20 in the form of a valve disk 22 is inserted in the valve housing 14. On the side 24 thereof which faces the pipe connecting branch 16*b*, the valve disk 22 can come into engagement with a valve seat 26 of the valve housing 14, said valve seat being designed in a manner extending about the full circumference. An annular seal 30 is arranged in an outer edge region 28 of the valve disk 22 in order to increase the sealing action between the valve disk 22 and the valve seat 26.

The valve disk 22 is connected to a multipart drive element 32 which has three elements 34-38 in the form of a stem 40, a spindle 42 and an inner stem 44. The drive element 32 is part of an actuator 46 which brings about, for example pneumatically, a movement of the valve disk 22 in the axial direction 48. The valve disk 22 and the stem 40 are formed as a single piece. The stem 40 and the spindle 42, and the spindle 42 and the inner stem 22 are screwed to each other.

By movement of the drive element 32 in the axial direction 48, the valve disk 22 can be raised from the valve seat 26 and moved into the valve housing interior 50 or deposited on the valve seat 26, as a result of which the valve 10 is opened or closed. In an open valve position, the product medium is permitted to flow from the pipe 12*a* via the pipe connecting branches 16*a*, *b* and the valve housing interior 50 into the pipe 12*b*. In a closed valve position, the outer edge region 28 of the valve disk 22 sits on the valve seat 26 such that product media are prevented from flowing between the pipes 12*a*, *b*.

The actuator 46 has an actuator housing 52 which is connected via an actuator housing flange 54 to a valve housing flange 56 of the valve housing 14. A required contact pressure between the two flanges 54, 56 is made possible via a clamping ring 58.

The valve 10 furthermore has a sealing diaphragm 60 for sealing the valve housing interior 50 on the drive side, said sealing diaphragm being received in a cylindrical receiving element 62 which is closed on one side.

The receiving element 62 is arranged in an axially immovable manner in the valve 10. For this purpose, a receiving element end region 64 of a circumferential surface 66 of the receiving element 62, which receiving element end region faces the sealing diaphragm 60, is widened radially outward and bears against a lower side 68 of the actuator housing flange 54. The receiving element 62 serves at the same time as an axial guide for the spindle 42. A spindle end region 70 which faces in the direction of the stem 40 of the drive element 32 is widened in such a manner that the outside diameter $d_1$ thereof is designed to be slightly smaller than an inside diameter dz of the circumferential surface 66 of the receiving element 62 such that the spindle end region 70 is always guided in a centered manner along an inner side 72 of the circumferential surface 66 of the receiving element 62. The base 74 of the receiving element 62 furthermore has a through bore 76 through which the spindle 42 extends.

Figure 2:
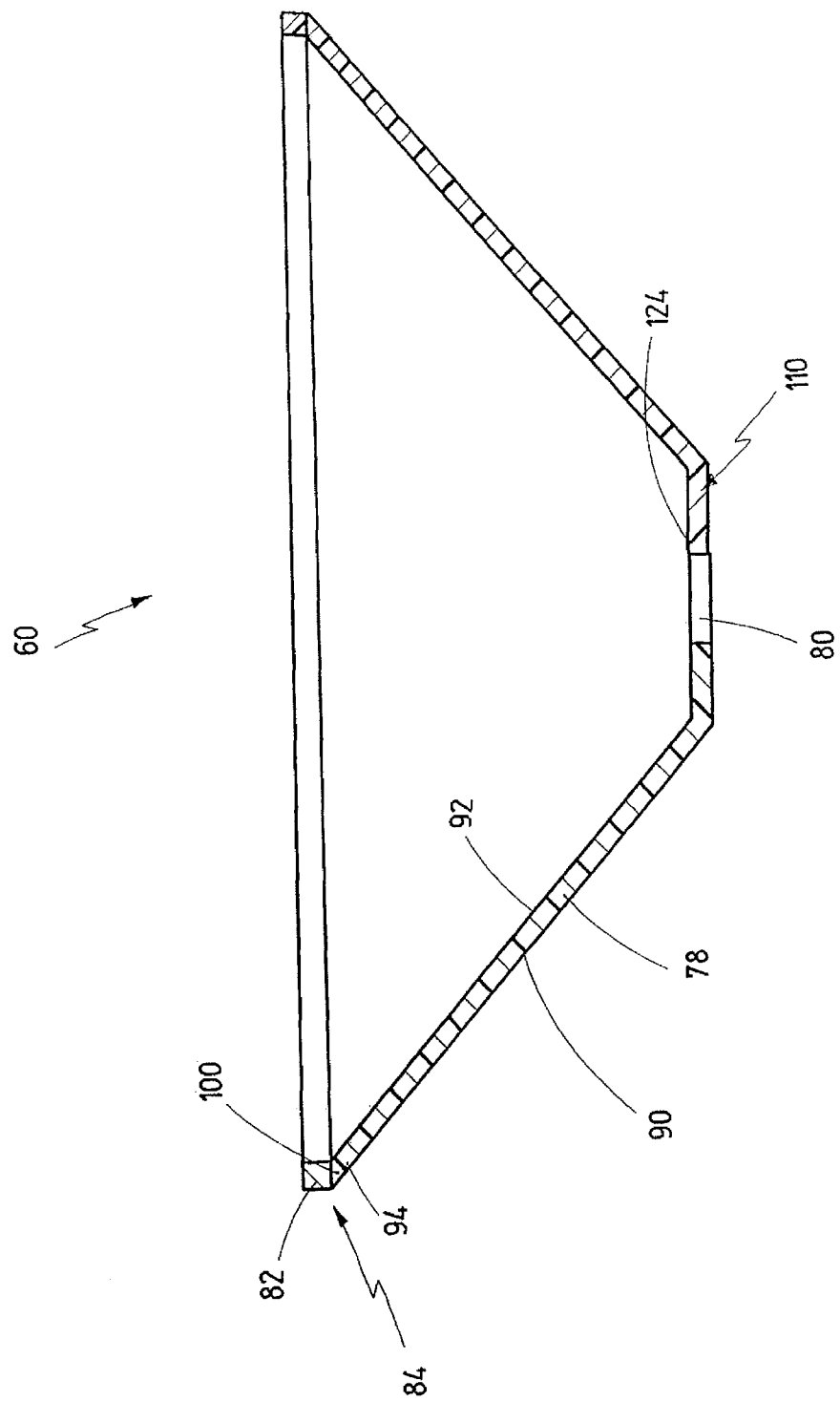
FIG. 2 shows a sealing diaphragm of the valve according to the invention in FIG. 1.

FIG. 2 shows the sealing diaphragm 60 on its own. The sealing diaphragm 60 has a radially extending diaphragm body 78 which has, approximately centrally, a radially inner, for example circular, opening 80 through which the drive element 32 runs (cf. FIG. 1). Before the sealing diaphragm 60 is fitted into the valve 10, the diaphragm body 78 is originally funnel-shaped. It is also possible for the diaphragm body 76 of the sealing diaphragm 60 to extend in one plane.

The sealing diaphragm 60 is manufactured from a dimensionally stable plastic, as a result of which the sealing diaphragm 60 has increased strength and no additional reinforcing element for reinforcing the sealing diaphragm 60 in relation to tensile and pressure loads occurring in the operation of the valve 10 is required. The plastic is a crosslinked laminated plastic, and therefore the diaphragm body 78 is mechanically particularly durable. The plastic is thermally resistant up to at least approximately 130° C., preferably up to at least approximately 150° C., furthermore preferably up to at least approximately 165° C. and even more preferably up to at least approximately 180° C., and therefore the sealing diaphragm 60 can be used in valves 10 which are automatically heated by hot cleaning and sterile media flowing through the valve 10. The plastic is also chemically resistant in order to ensure that the sealing diaphragm 60 is chemically stable when aggressive media, in particular the cleaning media, flow through the valve housing interior 50. The sealing diaphragm is preferably manufactured from a class of materials which are formed on the basis of polytetrafluoroethylene plastic and have a laminated structure, as a result of which the sealing diaphragm advantageously has a high compressive creep resistance and a high springing-back and compensating capability while at the same time having great chemical resistance.

Figure 3:
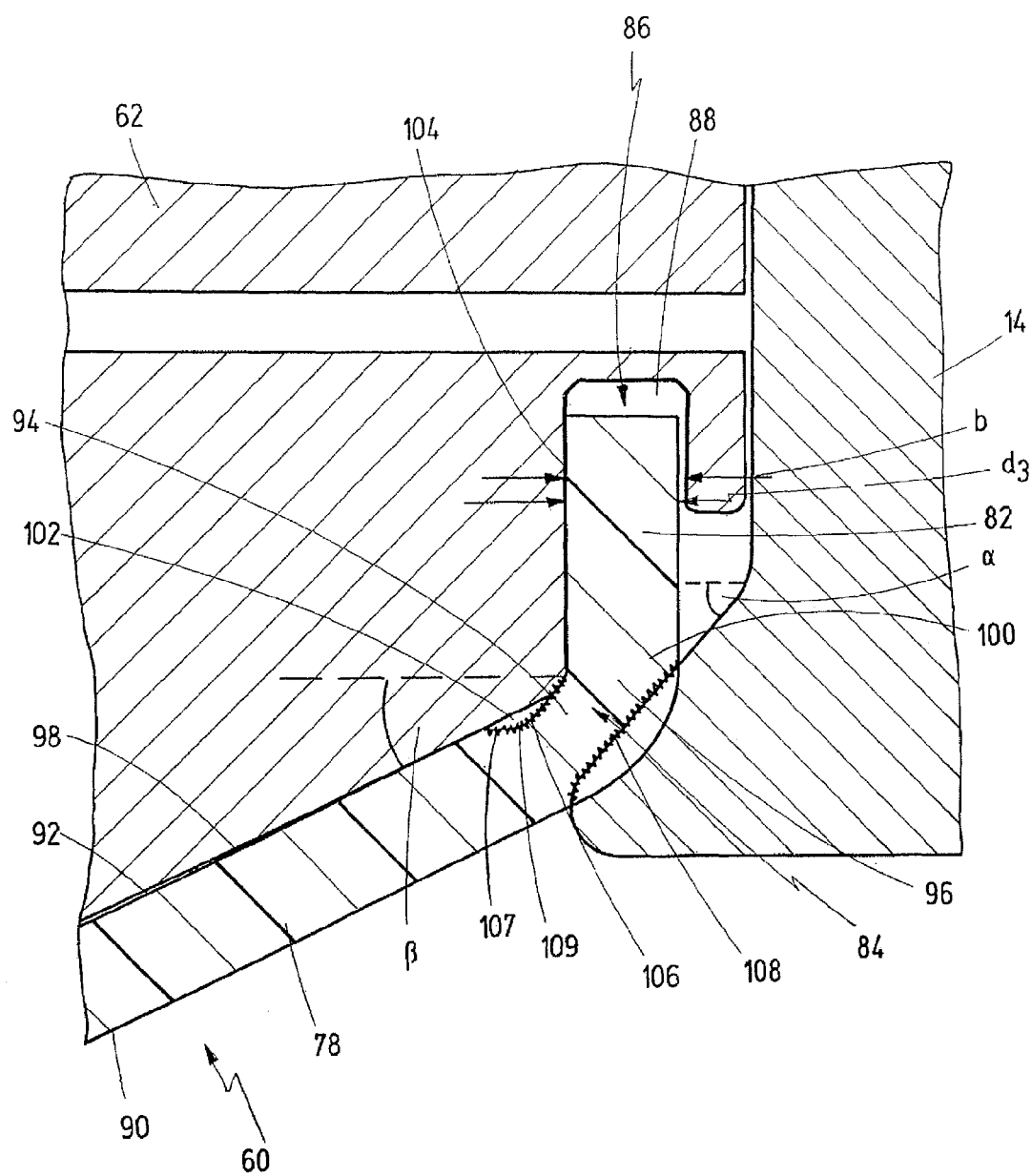
FIG. 3 shows an enlarged view of the valve in FIG. 1 in the region of a radially outer edge region of a diaphragm body of the sealing diaphragm in FIG. 2.
Figure 4:
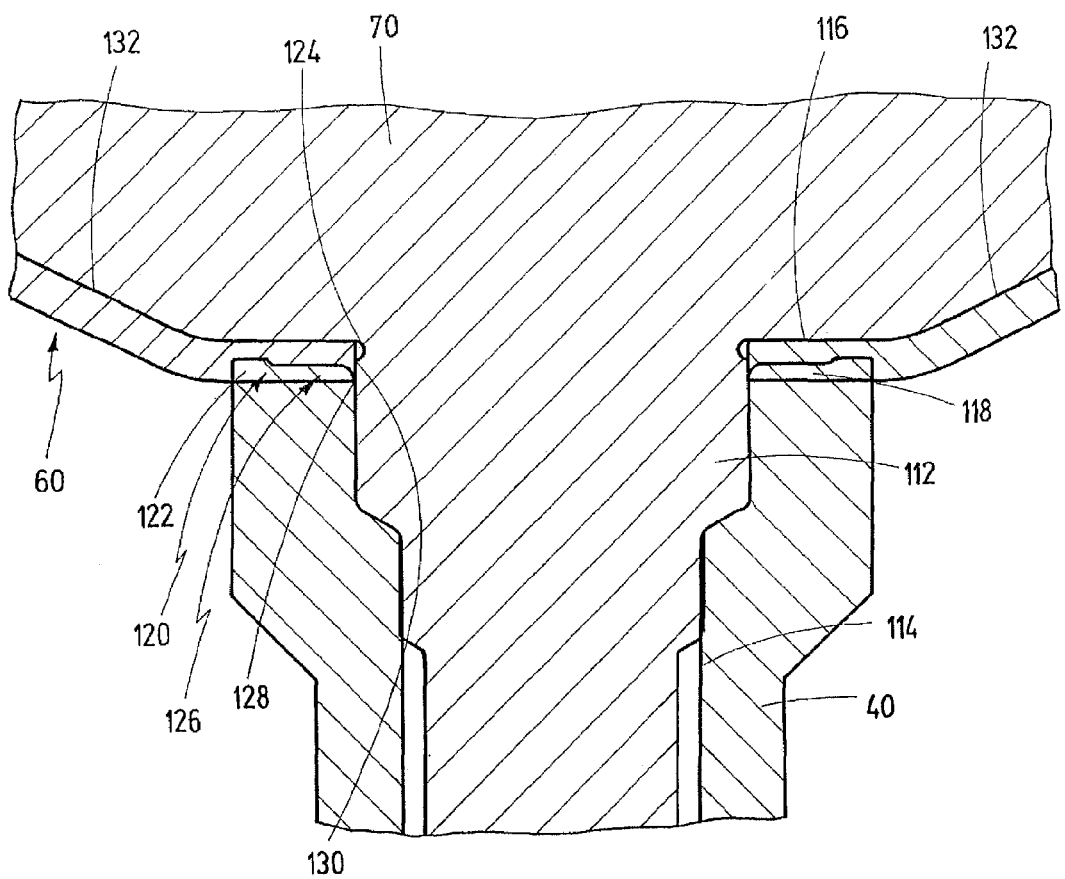
FIG. 4 shows a further enlarged view of the valve in FIG. 1 in the region of a radially inner edge region of the diaphragm body of the sealing diaphragm in FIG. 2.

FIGS. 3 and 4 show enlarged views of the sealing diaphragm 60 in its mounted position in the valve 10.

A first section 82 of a radially outer edge region 84 of the diaphragm body 78 is received in a seat 86, here in an axial groove 88 designed in a manner extending about the full circumference, of the receiving element 62. The first section 82 of the radially outer edge region 84 is bent over in the axial direction 48 relative to the funnel-shaped diaphragm body 78 (cf. FIG. 2). A diameter of the radially outer edge region 84 of the diaphragm body 78 corresponds approximately to a diameter of a circumferential line of the groove 88. A thickness $d_3$ of the sealing diaphragm 60 is designed to be slightly smaller than a width b of the groove 88, thus enabling the radially outer edge region 84 to be particularly easily placed into the groove 88. The groove 88 of the receiving element 62 is open toward the valve housing interior 50 such that an outer side 90 of the diaphragm body 78 points toward the valve housing interior 50 and an inner side 92 of the diaphragm body 78 points toward the spindle 42 of the actuator 46. The first section 82 of the radially outer edge region 84 of the diaphragm body 78 can be correspondingly bent during the manufacturing of the sealing diaphragm 60 in order to be able to insert the first section 82 of the radially outer edge region 84 particularly easily into the groove 88.

In order to prevent the sealing diaphragm 60 from slipping out of the groove 88, a second, radially inner section 94 of the radially outer edge region 84 is clamped radially between the valve housing 14 and the receiving element 62. A valve housing wall 96 which is arranged in the region of the valve housing flange 56 presses the second section 94 of the radially outer edge region 84 against a first receiving element wall 98 of the receiving element end region 64. This causes elastic deformation of the diaphragm body 78 in the region of the valve housing wall 96. The valve housing wall 96 and the first receiving element wall 98 are inclined toward the valve housing interior 50, for example, at an angle of inclination $\alpha, \beta$ of approximately 20° to 30° relative to a radial direction 99 such that the funnel-shaped diaphragm body 78 bears in the region of the second section 94 against the first receiving element wall 98. The angle of inclination $\alpha, \beta$ of the first receiving element wall 98 is designed to be smaller than the angle of inclination $\alpha$ of the valve housing wall 96 such that a contact pressure of the valve housing wall 96 onto the second section 94 of the radially outer edge region 84 of the sealing diaphragm 60 is increased in a region of curvature 100 of the second section 94 of the radially outer edge region 84. This results in the sealing diaphragm 60 being particularly readily clamped, thus optimally sealing off the valve housing interior 50 from the actuator 46.

The first receiving element wall 98 furthermore has a projection 102 which is designed such that it extends about the full circumference and the substantially rounded surface of which is free from sharp edges or corners such that the diaphragm body 78 lies thereabove and cuts which may impair the seal tightness of the sealing diaphragm 60 do not occur in the diaphragm body 78. The projection 102 which is of approximately symmetrical configuration is arranged on the first receiving element wall 98 directly adjacent to the groove 88 and reduces an intermediate space between the first receiving element wall spacing 98 and the valve housing wall 96, since the intermediate space is reduced in size in the direction of the valve housing interior 50. Furthermore, the projection 102 engages in a form-fitting manner in the diaphragm body 78 and brings about a plastic deformation of the diaphragm body 78 in said region. This improves the clamping action on the sealing diaphragm 60.

By the radially outer edge region 84 being clamped in the region of curvature 100, the diaphragm body 78 bears against a radially inner groove wall 104 and the first receiving element wall 98 of the receiving element 62. This results in the sealing diaphragm 60 being particularly tightly sealed in the region of the radially outer edge region 84. The material of the sealing diaphragm 60, which material is compressed in the region of curvature 100, can flow, for example, in the direction of one end of the groove and can fill a free space in the groove 88.

The valve housing wall 96 and the first receiving element wall 98 furthermore each have a ribbing 106, 107 with in each case at least one rib 108, 109, illustrated in pointy form in FIG. 3, in the region of the second section 94 of the radially outer region 84 of the sealing diaphragm 60, said ribs engaging in a form-fitting manner in the material of the sealing diaphragm 60. The ribbing 107 of the first receiving element wall 98 is preferably arranged on the surface of the projection 102 such that the ribs 109 press into the material of the sealing diaphragm 60 during the clamping of the radially outer edge region 84. Instead of the ribbings 106, 107, toothings may be provided on the valve housing wall 96 and the first receiving element wall 98, said toothings engaging in a form-fitting manner in the material of the sealing diaphragm 60. It is also possible for only the first receiving element wall 98 or the valve housing wall 96 to be provided with the ribbings 107 or 106.

The form-fitting connection between the ribbings 106, 107 of the sealing diaphragm 60 and the material of the sealing diaphragm 60 also prevents the sealing diaphragm 60 from slipping, and therefore the sealing diaphragm 60 is retained even more securely in the valve 10. The form-fitting connection furthermore brings about plastic deformation of the sealing diaphragm 60 in the region of the ribbings 106, 107. The ribs 108, 109 of the ribbings 106, 107 are preferably designed in a manner extending about the full circumference and run substantially in the circumferential direction, i.e. transversely with respect to the axial direction 48, in order to further improve the secure, positionally stable retention of the sealing diaphragm 60.

The sealing diaphragm 60 is furthermore clamped axially between the stem 40 and the spindle 42 in a radially inner edge region 110 arranged adjacent to the opening 80 of the diaphragm body 78. By means of the screwing of a pin 112, which is provided with a thread, of the spindle 42 to a blind bore 114, which is likewise provided with a thread, in the stem 20, end sides 116, 118 of the spindle 42 and of the stem 40 press against each other such that the second edge region 110 of the diaphragm body 78 is clamped. The sealing diaphragm 60 is manufactured in such a manner that the radially inner edge region 110 of the diaphragm body 78 runs approximately perpendicular to the first section 82 of the radially outer edge region 84 (cf. FIG. 2).

In a radially outer annular region 120 of its end side 118, which points toward the actuator 46 and toward the diaphragm body 78, the stem 40 has a projection 122 which extends about the full circumference and engages, by means of the second edge region 110 being clamped, in the material of the sealing diaphragm 60 and can plastically deform the latter. The projection 122 is spaced apart radially from a radially inner edge 124 of the radially inner edge region 110 of the diaphragm body 78. A radially inner annular region 126 of the end side 118 of the stem 40 is of planar design, seen in the radial direction 99, and, at its radially inner region 128, is rounded toward the spindle 42. The radially inner region 128 of the end side 118 of the stem 40 is arranged adjacent to the radially inner edge 124 of the diaphragm body 78. The end side 116 of the spindle 42 is of planar design, as seen in the radial direction 48. The projection 122 engages in a form-fitting manner in the radially inner edge region 110 of the diaphragm body 78, thus resulting in a liquid-tight axial clamping. It furthermore prevents product from moving behind the clamping region, and therefore the material of the sealing diaphragm 60 is not exposed to the media in the holding region. The penetration of the projection 122 into the material of the radially inner edge region 110 can cause a plastic deformation of the material. The material of the radially inner edge region 110, which material is pressed away by the projection 122, flows in the direction of the spindle 42 and fills a free space between the rounded region 128 of the end surface 118 of the stem 40 and a spindle side 130 of the spindle 42 and additionally presses the radially inner edge 124 on the inner side 92 of the diaphragm body 78 elastically against the spindle side 130. This results in the sealing diaphragm 60 being clamped radially and in a particularly optimum sealing action.

A spindle end region wall 132 adjacent to the end side 116 of the spindle end region 70 has approximately the same inclination as the first receiving element wall 98. When the valve disk 22 is deposited on the valve seat 26, the funnel-shaped diaphragm body 78 of the sealing diaphragm 60 bears against the spindle end region wall 128, since the inclination thereof corresponds to the natural shape of the sealing diaphragm 60.

Furthermore, a second, radially inner receiving element wall 134 has an inclination which is approximately opposite to and of the same size as the first receiving element wall 98, against which inclination the sealing diaphragm 60 bears when the valve disk 22 is moved into the valve housing interior 50. The second receiving element wall 134 likewise supports the diaphragm body 78 in relation to pressure loads from the valve housing interior 50.

Figure 5A:
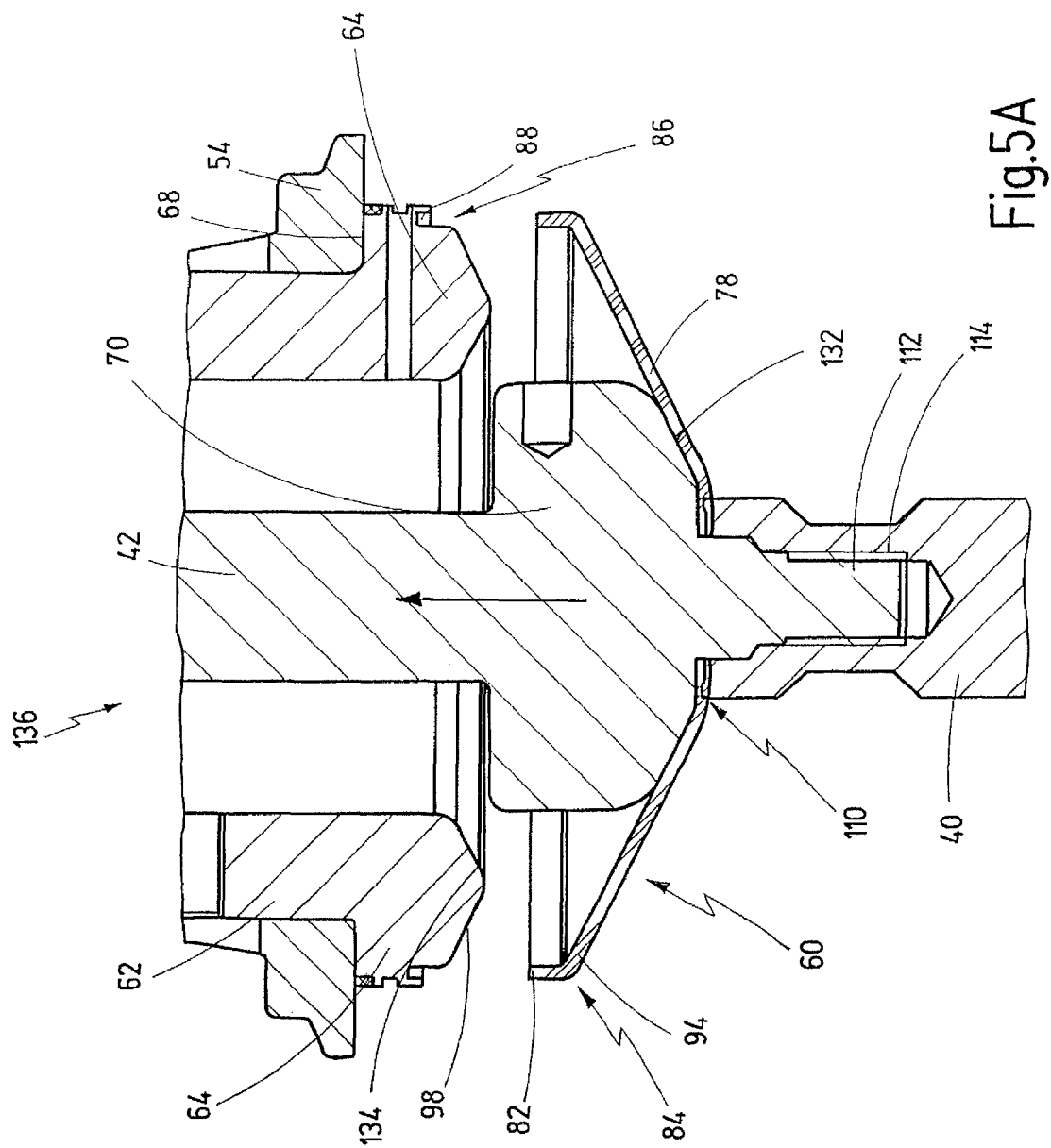
FIGS. 5A-5C show stages of fitting the sealing diaphragm in FIG. 2 into the valve according to the invention in FIG. 1.
Figure 5B:
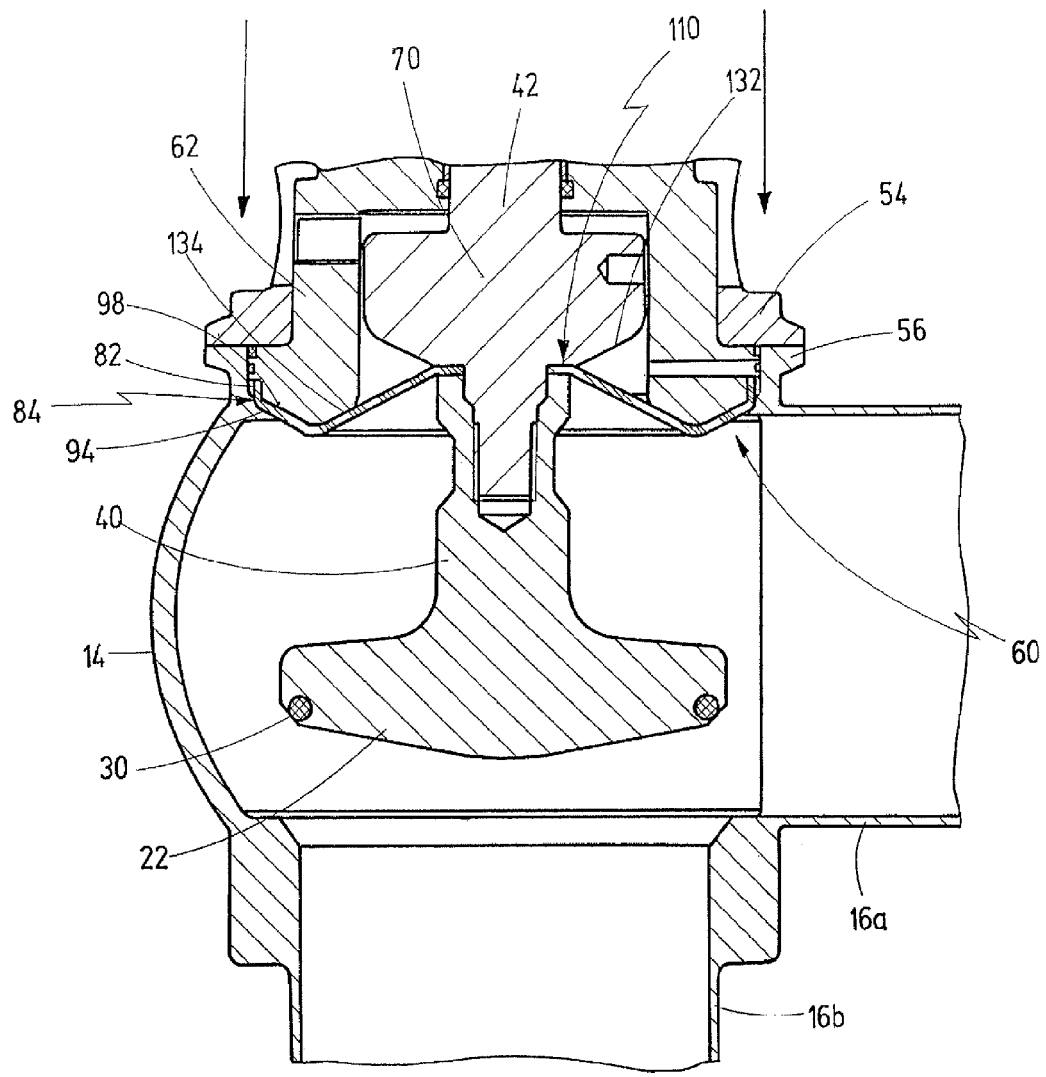
Figure 5C:
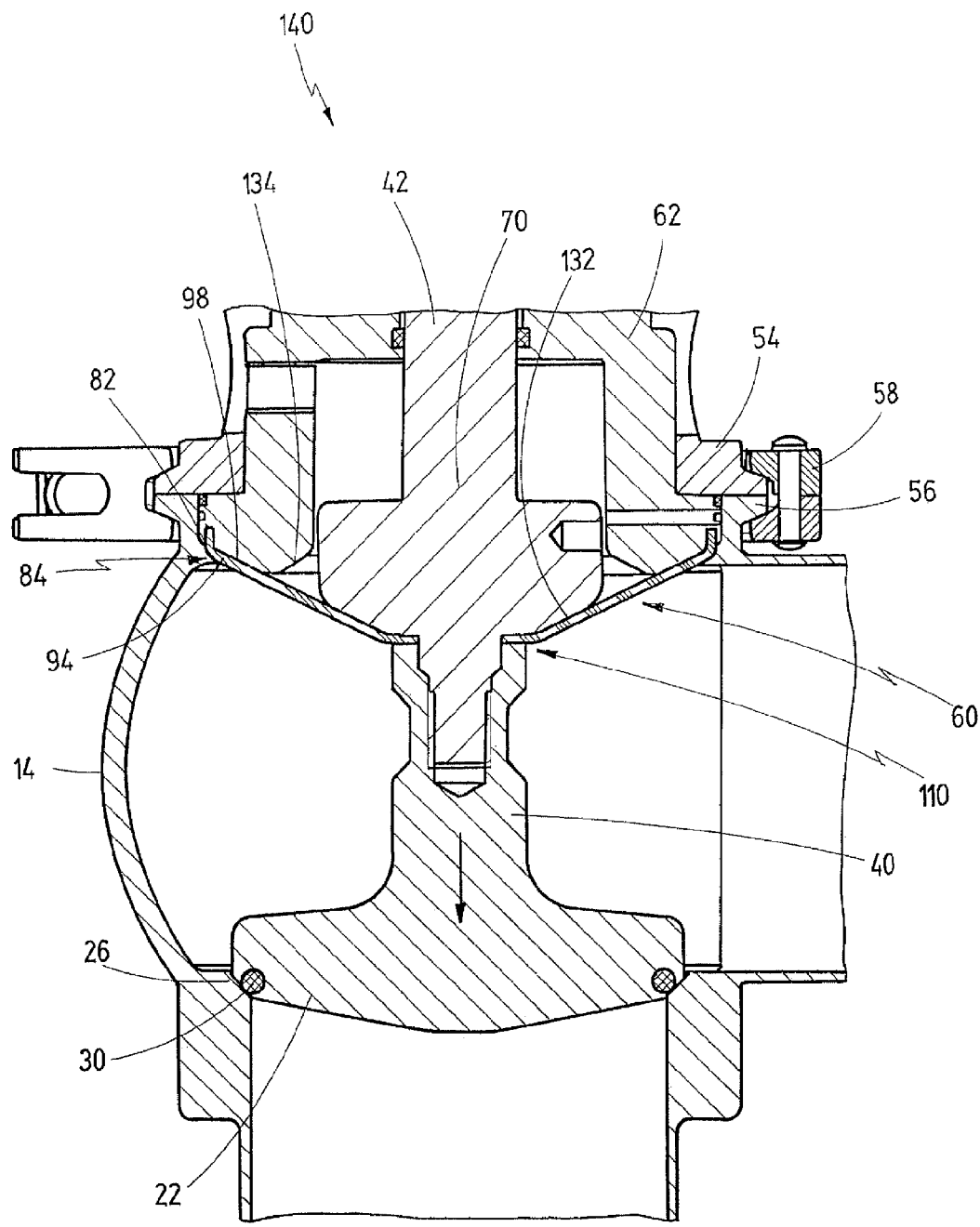

FIGS. 5A-5C show stages 136-140 of fitting the sealing diaphragm 60 into the valve 10. In the stage 136 shown in FIG. 5A, the sealing diaphragm 60 is held between the spindle 42 and the stem 40 of the actuator 46. The radially inner edge region 110 of the sealing diaphragm 60 is clamped axially and radially, thus causing the sealing diaphragm 60 to be tightly sealed in said region. The radially outer edge region 84 of the sealing diaphragm 60 has not yet been received into the groove 88 in the receiving element 62.

Starting from the fitting stage 136 of the sealing diaphragm 60, first of all the first section 82 of the radially outer edge region 84 of the sealing diaphragm 60 is placed into the groove 88 in the receiving element 62 by the drive element 32 being actuated in such a manner that the valve disk 22 is raised. By this means, the diaphragm body 78 of the sealing diaphragm 60 is placed against the first receiving element wall 98 and the second receiving element wall 134 such that the sealing diaphragm 60 runs in an approximately S-shaped manner as seen in cross section. In this case, the sealing diaphragm 60 is designed structurally in such a manner that, upon retraction of the valve disk 22, said sealing diaphragm is automatically introduced into the groove 88 and positioned in a position required for the clamping of the radially outer edge region 84. Following this, it is checked, for example manually by visual checking, whether the first section 82 of the radially inner edge region 84 of the diaphragm body 60 has been received in the groove 88 in a manner extending about the full circumference. The actuator 46 is then inserted together with the valve disk 22 and the sealing diaphragm 60 into the valve housing 14 (cf. FIG. 5B).

In the stage 140, which is shown in FIG. 5C, of fitting the sealing diaphragm 60 into the valve 10, the actuator 46 is actuated in such a manner that the valve disk 22 is moved downward. The valve disk 22 is deposited in this case on the valve seat 26 of the valve housing 14, as a result of which the sealing diaphragm 60 achieves its funnel-shaped form again.

Figure 6A:
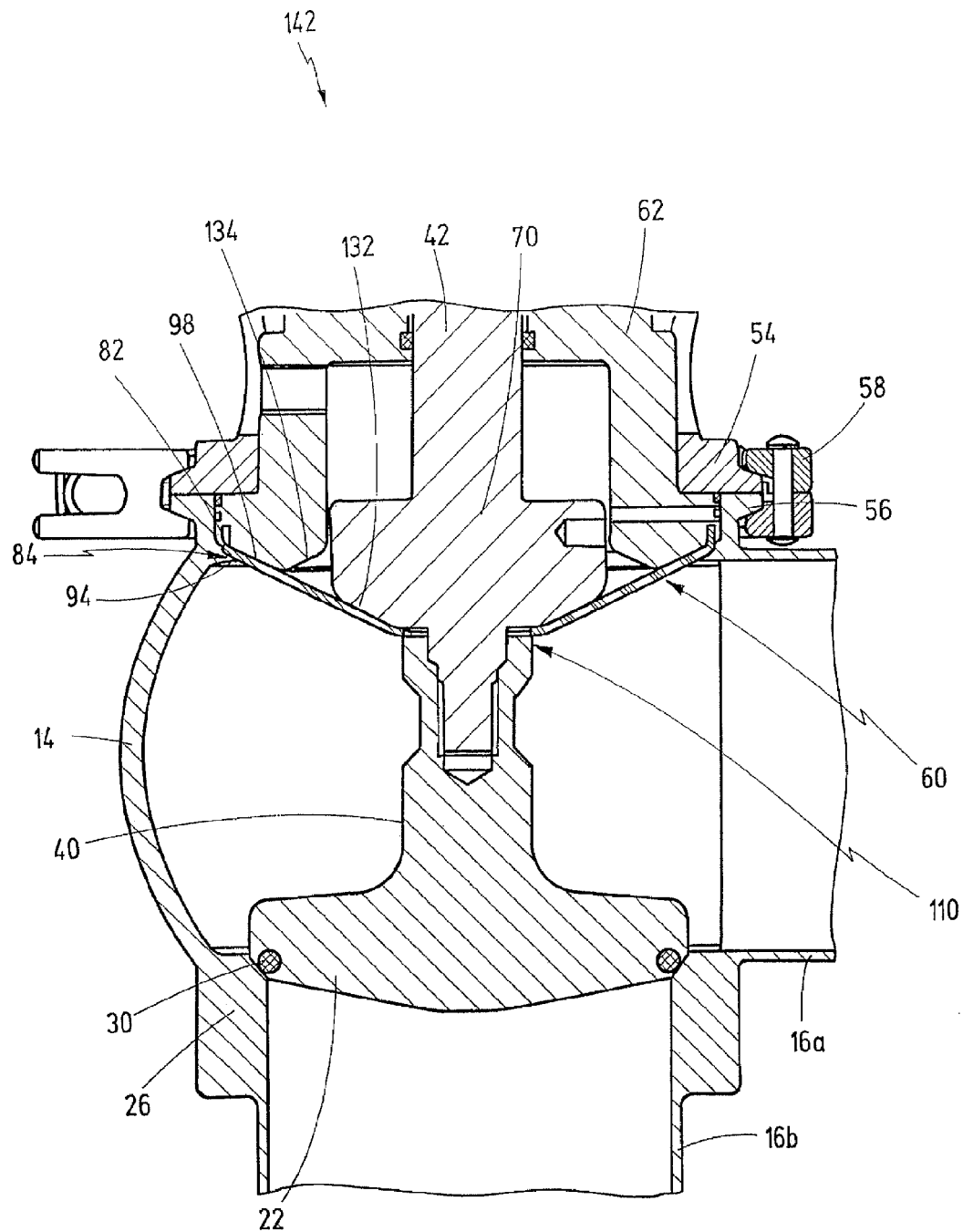
FIGS. 6A, 6B show two operating states of the valve according to the invention in FIG. 1.
Figure 6B:
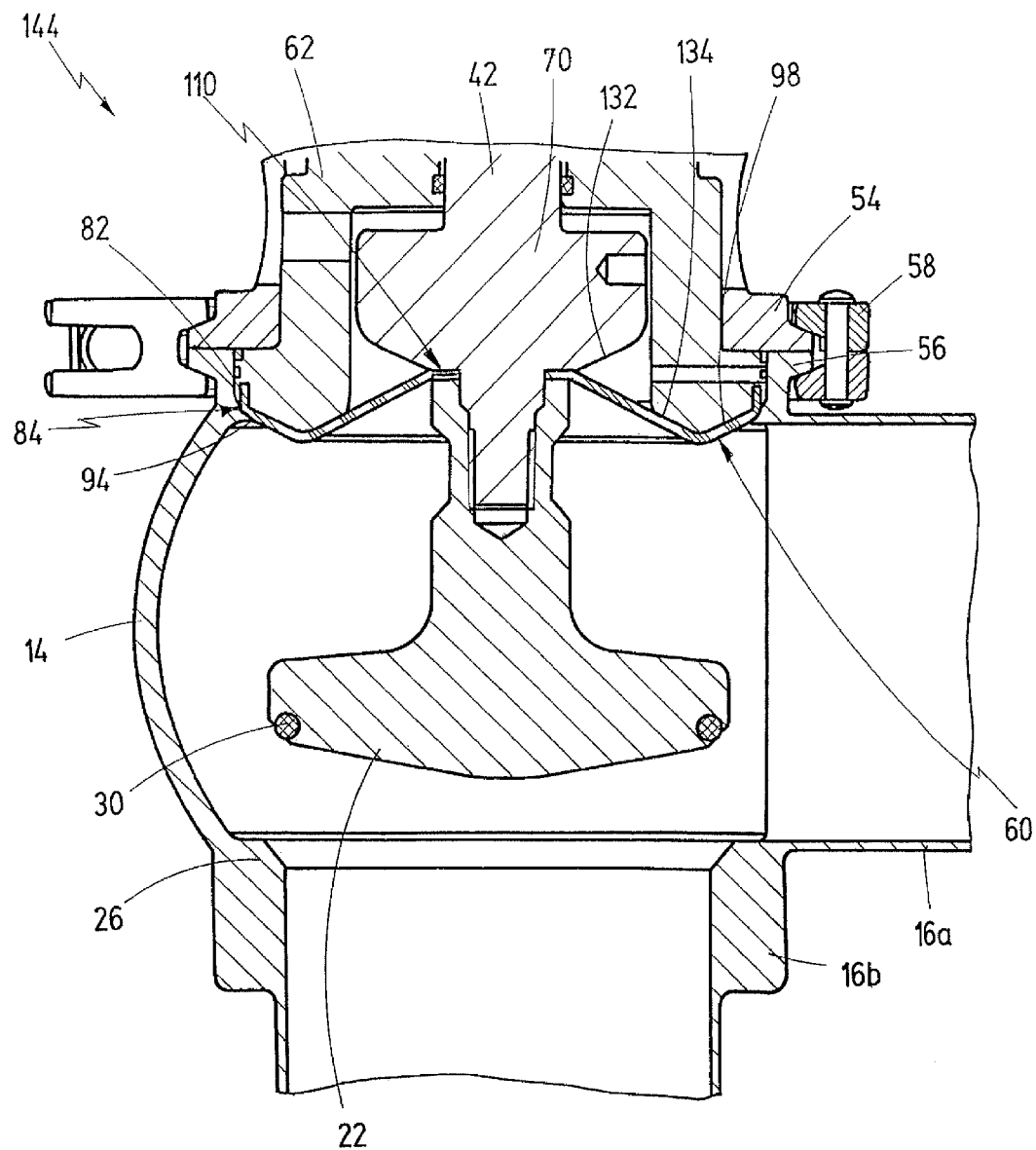

FIGS. 6A, 6B show two operating states 142, 142 of the valve 10. In the first operating state 142 which corresponds to a closed valve position, the pipe connecting branch 16b is sealed off from the pipe connecting branch 16a, since the valve disk 22 is seated on the valve seat 26 (cf. FIG. 6A). The annular seal 30 in the edge region 28 of the valve disk 22 brings about particularly high seal tightness. In this case, the sealing diaphragm 60 has its funnel-shaped form.

In the second operating state 142 of the valve 10, which state corresponds to an open valve position, the valve disk 22 is displaced in the direction of the actuator 46 such that product media can pass from the pipe connecting branch 16a into the pipe connecting branch 16b. Since the spindle 42 is moved along the circumferential surface 66 of the receiving element 62 in the direction of the base 74 of the receiving element 62, the sealing diaphragm 60 bears against the first and second receiving element walls 98, 130 and has the S-shaped form as seen in cross section.

What is claimed is:

1. A valve for separating product media in pipes of a product-carrying system, comprising:
    a valve housing having a valve housing interior and defining an axial direction,
    a valve body arranged in said valve housing interior,
    a drive element connected to said valve body for moving said valve body in said axial direction,
    a sealing diaphragm for sealing said valve housing interior against a drive side, said sealing diaphragm having
        a radially extending diaphragm body, said diaphragm body having a radially inner opening through which said drive element reaches, said diaphragm body further having a radially outer edge region and a radially inner edge region, said radially inner edge region surrounding said radially inner opening, said radially outer edge region being clamped radially and said radially inner edge region being clamped axially,
        said sealing diaphragm being manufactured from a dimensionally stable plastic which is thermally resistant up to at least approximately 130° C.,
    an axially immovable receiving element having an axially extending seat which extends about a full circumference of said receiving element, wherein said radially outer edge region of said diaphragm body has a first section which is received in said axially extending seat,
    wherein said radially outer edge region has a second, radially inner section which is clamped between a valve housing wall of said valve housing and a first receiving element wall of said receiving element, and
    wherein said valve housing wall and said first receiving element wall are inclined toward said valve housing interior, an angle of inclination of said valve housing wall relative to a radial direction being greater than an angle of inclination of said first receiving element wall relative to said radial direction.

2. The valve of claim 1, wherein said plastic of said sealing diaphragm is thermally resistant up to at least approximately 150° C.

3. The valve of claim 1, wherein said plastic of said sealing diaphragm is chemically resistant.

4. The valve of claim 1, wherein said plastic of said sealing diaphragm is a crosslinked laminated material.

5. The valve of claim 1, wherein a width of said seat is slightly larger than a thickness of said diaphragm body.

6. The valve of claim 1, wherein said seat is open toward said valve housing interior.

7. The valve of claim 1, wherein said second section of said radially outer edge region bears against said first receiving element wall.

8. The valve of claim 1, wherein said first receiving element wall has a projection which is arranged in a region of said second section of said radially outer edge region of said diaphragm body.

9. The valve of claim 8, wherein said projection is designed in a manner extending about a full circumference of said receiving element wall.

10. The valve claim 1, wherein said valve housing wall has, in a region of said second section of said radially outer edge region, a ribbing with at least one circumferencially extending rib which engages in a form-fitting manner into the material of said diaphragm body.

11. The valve of claim 1, wherein said receiving element wall has, in a region of said second section of said radially outer edge region, a ribbing with at least one circumferencially extending rib which engages in a form-fitting manner in the material of said diaphragm body.

12. The valve of claim 11, wherein said first receiving element wall has a projection which is arranged in a region of said second section of said radially outer edge region of said diaphragm body, and wherein said ribbing of said first receiving element wall is arranged on a surface of said projection.

13. The valve of claim 1, wherein said radially inner edge region of said diaphragm body is clamped between a first element and a second element of said drive element, an end side of said first element, which end-side faces said diaphragm body, having a projection which faces said diaphragm body and engages in said radially inner edge region of said diaphragm body.

14. The valve of claim 13, wherein said projection is spaced apart radially from an inner edge of said radially inner edge region of said diaphragm body.

15. The valve of claim 13, wherein said projection is designed in a manner extending about a full circumference of said end side of said first element of said drive element.

16. The valve of claim 13, wherein a region of said end side of said first element, which end side is adjacent to said radially inner edge of said radially inner edge region of said diaphragm body, is rounded as seen radially inward.

17. A valve for separating product media in pipes of a product-carrying system, comprising:
    a valve housing having a valve housing interior and defining an axial direction,
    a valve body arranged in said valve housing interior,
    a drive element connected to said valve body for moving said valve body in said axial direction,
    a sealing diaphragm for sealing said valve housing interior against a drive side, said sealing diaphragm having
        a radially extending diaphragm body, said diaphragm body having a radially inner opening through which said drive element reaches, said diaphragm body further having a radially outer edge region and a radially inner edge region, said radially inner edge region surrounding said radially inner opening, said radially outer edge region being clamped radially and said radially inner edge region being clamped axially,
        said sealing diaphragm being manufactured from a dimensionally stable plastic which is thermally resistant up to at least approximately 130° C.,
    wherein said radially inner edge region of said diaphragm body is clamped between a first element and a second element of said drive element, an end side of said first element, which end-side faces said diaphragm body, having a projection which faces said diaphragm body and engages in said radially inner edge region of said diaphragm body, and
    wherein said projection is spaced apart radially from an inner edge of said radially inner edge region of said diaphragm body.

18. A valve for separating product media in pipes of a product-carrying system, comprising:
    a valve housing having a valve housing interior and defining an axial direction,
    a valve body arranged in said valve housing interior,
    a drive element connected to said valve body for moving said valve body in said axial direction,
    a sealing diaphragm for sealing said valve housing interior against a drive side, said sealing diaphragm having
        a radially extending diaphragm body, said diaphragm body having a radially inner opening through which said drive element reaches, said diaphragm body further having a radially outer edge region and a radially inner edge region, said radially inner edge region surrounding said radially inner opening, said radially outer edge region being clamped radially and said radially inner edge region being clamped axially,
        said sealing diaphragm being manufactured from a dimensionally stable plastic which is thermally resistant up to at least approximately 130° C.,
    wherein said radially inner edge region of said diaphragm body is clamped between a first element and a second element of said drive element, an end side of said first element, which end-side faces said diaphragm body, having a projection which faces said diaphragm body and engages in said radially inner edge region of said diaphragm body, and
    wherein a region of said end side of said first element, which end side is adjacent to said radially inner edge of said radially inner edge region of said diaphragm body, is rounded as seen radially inward.

* * * * *